US012168294B2

(12) United States Patent
Buchner et al.

(10) Patent No.: US 12,168,294 B2
(45) Date of Patent: Dec. 17, 2024

(54) MODULAR ROBOT

(71) Applicant: Continental Automotive GmbH, Hannover (DE)

(72) Inventors: Thiemo Buchner, Hannover (DE); Andreas Mandl, Hannover (DE); Antonio Weber, Hannover (DE)

(73) Assignee: Continental Automotive GmbH, Hannover (DE)

( * ) Notice: Subject to any disclaimer, the term of this patent is extended or adjusted under 35 U.S.C. 154(b) by 348 days.

(21) Appl. No.: 17/773,380

(22) PCT Filed: Nov. 5, 2020

(86) PCT No.: PCT/EP2020/081160
§ 371 (c)(1),
(2) Date: Apr. 29, 2022

(87) PCT Pub. No.: WO2021/089713
PCT Pub. Date: May 14, 2021

(65) Prior Publication Data
US 2022/0402116 A1 Dec. 22, 2022

(30) Foreign Application Priority Data

Nov. 6, 2019 (DE) ...................... 10 2019 217 126.5

(51) Int. Cl.
*B25J 5/00* (2006.01)
*B25J 9/08* (2006.01)
(52) U.S. Cl.
CPC ................. *B25J 5/007* (2013.01); *B25J 9/08* (2013.01)
(58) Field of Classification Search
CPC ..................................... B25J 5/007; B25J 9/08
See application file for complete search history.

(56) References Cited

U.S. PATENT DOCUMENTS 4,536,690 A * 8/1985 Belsterling ............ B62D 57/02
318/687
4,629,369 A * 12/1986 Cox ........................ B66C 19/00
175/219
(Continued)

FOREIGN PATENT DOCUMENTS

CN 201297476 Y 8/2009
CN 102476652 A 5/2012
(Continued)

OTHER PUBLICATIONS

Indian Examination Report for Indian Application No. 202237025401, dated Sep. 13, 2022, with translation, 6 pages.
(Continued)

*Primary Examiner* — Erez Gurari
(74) *Attorney, Agent, or Firm* — Buchanan Ingersoll & Rooney PC

(57) ABSTRACT

A modular robot with a drive platform including: a first lateral drive module having at least two wheels and at least one motor for driving at least one of the wheels, a second lateral drive module having at least one wheel and at least one motor for driving the at least one wheel, a front crossmember module connecting first ends of the first and the second lateral drive module, and a rear crossmember module connecting first ends of the first and the second lateral drive module. One of the two lateral drive modules has a control unit for controlling the motors of the two lateral drive modules. The two drive modules have first connecting devices at their respective ends and the two crossmember modules have second connecting devices in the region of their respective ends. The first and the second connecting devices have mechanical connections. At least one of the two drive modules has at least one docking device for (Continued)

docking an application unit on the drive platform and the at least one docking device has mechanical and/or electrical connections.

11 Claims, 1 Drawing Sheet

(56) References Cited

U.S. PATENT DOCUMENTS

| | | | |
|---|---|---|---|
| 6,671,582 B1 | 12/2003 | Hanley | |
| 2010/0076598 A1 | 3/2010 | Herbert et al. | |
| 2012/0205168 A1* | 8/2012 | Flynn | B62D 55/00 |
| | | | 180/9.1 |
| 2013/0062153 A1 | 3/2013 | Ben-Tzvi et al. | |
| 2015/0142250 A1 | 5/2015 | Cavender-Bares et al. | |
| 2019/0106043 A1 | 4/2019 | Chang et al. | |
| 2019/0232504 A1 | 8/2019 | Radetzki et al. | |
| 2022/0402116 A1* | 12/2022 | Buchner | B62D 21/12 |
| 2023/0087057 A1* | 3/2023 | Wang | B25J 13/088 |
| | | | 700/245 |
| 2023/0286344 A1* | 9/2023 | Chung | B62D 57/028 |
| 2023/0292679 A1* | 9/2023 | Banerjee | B25J 11/00 |
| | | | 173/90 |
| 2024/0030863 A1* | 1/2024 | Brulo | F24S 80/00 |

FOREIGN PATENT DOCUMENTS

| | | |
|---|---|---|
| CN | 102951202 A | 3/2013 |
| CN | 105945892 A | 9/2016 |
| CN | 108327473 A | 7/2018 |
| DE | 102006022242 A1 | 11/2007 |
| DE | 102018102127 A1 | 8/2019 |
| EP | 3476548 A1 | 5/2019 |
| KR | 10-2014-0070129 A | 6/2014 |
| WO | 2006063314 A2 | 6/2006 |

OTHER PUBLICATIONS

German Search Report for German Application No. 10 2019 217 126.5, dated Dec. 1, 2020, with partial English translation, 7 pages.

Fendt FutureFarm, "Project Xaver: Research in the field of agricultural robotics, Precision Farming—Thinking ahead". https://www.fendt.com/int/xaver.html, retrieved from the internet Aug. 3, 2019, 7 pages.

Fraunhofer IPA, "AgriApps—Agricultural robot with »App« concept", URL:https://www.ipa.fraunhofer.de/de/referenzprojekte/AgriApps.html, retrieved from the internet Aug. 3, 2019, 6 pages (with translation).

Grimstad et al., "A Configuration-Independent Software Architecture for Modular Robots". 2018 International Conference on Reconfigurable Mechanisms and Robots (REMAR), IEEE, Jun. 20, 2018, pp. 1-8.

Grimstad et al., "On the design of a low-cost, light-weight, and highly versatile agricultural robot", 2015 IEEE International Workshop on Advanced Robotics and Its Social Impacts (ARSO), IEEE, Jun. 30, 2015, pp. 1-6.

International Search Report and Written Opinion for International Application No. PCT/EP2020/081160, with partial English translation, dated Feb. 22, 2021, 9 pages.

NAIO Technologies, "TED Multifunctional straddling vineyard robot", Escalquens, (2019) 4 S.—Firmenschrift. URL: https://www.naio-technologies.com/wp-content/uploads/2019/04/brochure-TED-ENGLISH-3.pdf, 4 pages.

NAIO Technologies, "Vineyard Weeding Robot", https://www.naio-technologies.com/en/agricultural-equipment/vineyard-weeding-robot/, retrieved from the internet Aug. 3, 2019, 6 pages.

Saga Robotics, "Thorvald in different configurations", Mar. 6, 2019, YouTube, retrieved from the Internet: https://www.youtube.com/watch?v=9wZIU8aq7pE, 1 page.

Saga Robotic, "Thorvald II—an agricultural robot by SAGA Robotics", Dec. 2, 2016, YouTube, retrieved from the Internet: https://www.youtube.com/watch?v=uae7 ga-q5oU, 1 page.

Warthog Unmanned Ground Vehicle Robot—Clearpath, https://www.clearpathrobotics.com/warthog-unmanned-ground-vehicle-robot/, retrieved from the internet Aug. 3, 2019, 4 pages.

Grimstad et al., "A Configuration-Independent Software Architecture for Modular Robots", 2018 4th International Conference on Reconfigurable Mechanisms and Robots (ReMAR), (Jun. 20, 2018), (9 Pages).

Office Action (The First Office Action) issued May 31, 2024, by the State Intellectual Property Office of People's Republic of China in corresponding Chinese Patent Application No. 202080077199.1 and an English/German translation of the Office Action. (21 pages).

* cited by examiner

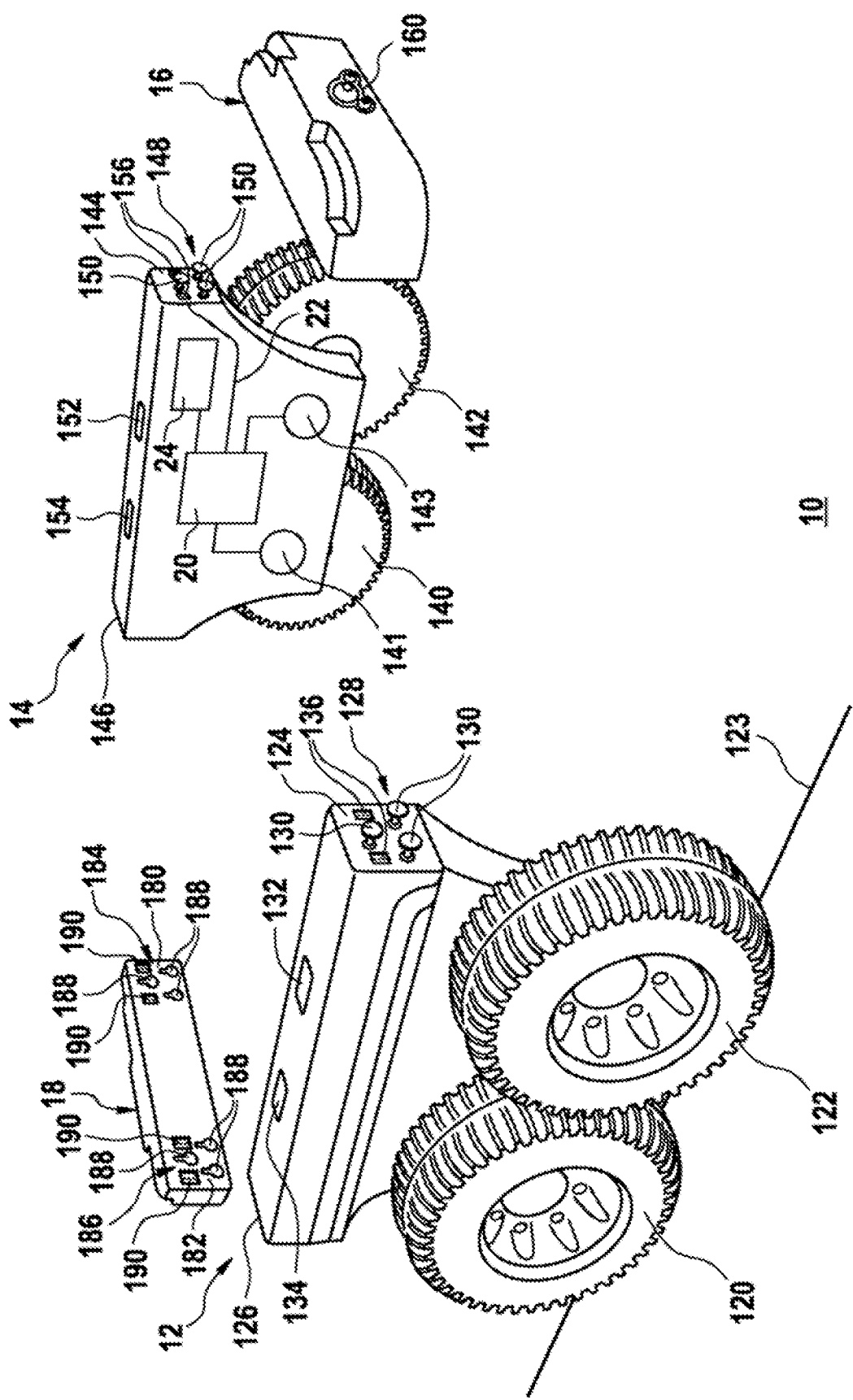

MODULAR ROBOT

CROSS REFERENCE TO RELATED APPLICATIONS

This application is the U.S. National Phase Application of PCT International Application No. PCT/EP2020/081160, filed Nov. 5, 2020, which claims priority to German Patent Application No. 10 2019 217 126.5, filed Nov. 6, 2019, the contents of such applications being incorporated by reference herein.

FIELD OF THE INVENTION

The present disclosure relates to a modular robot, in particular for use in agriculture.

BACKGROUND OF THE INVENTION

The use of robotics in agriculture is known, for example, from U.S. Pat. No. 6,671,582B1, international patent application WO2006/063314A2 and US patent application US2015/142250A1, each incorporated by reference herein.

The Xaver project by AGCO GmbH relates to the use of robots in agriculture. Here, each of a large number of robots used has its own integrated planting unit. The robots are electrically driven and communicate with a logistics unit via a cloud.

The Canadian company Clearpath Robotics, Inc. offers a mobile robot platform under the name "Warthog" that is suitable for use in agriculture and can be flexibly adapted to different purposes using various modules.

The "AgriApps" project by the Fraunhofer Institute for Manufacturing Engineering and Automation IPA relates to agricultural robots which can be adapted to the respective purpose in agriculture using exchangeable application-specific sensors and actuators.

The French company NAIO TECHNOLOGIES likewise offers robots for use in agriculture, in particular a robot for weeding vineyards. Information about this robot is available on the Internet at URLhttps://www.naio-technologies.com/en/agricultural-equipment/vineyard-weeding-robot/.

A robot intended for use in agriculture and offered by the Norwegian company Saga Robotics is known under the name Thorvald, see the information available on the Internet at URL https://sagarobotics.com/pages/thorvald-platform in this respect. The dimensions of this robot platform can be flexibly adapted to the respective purpose. For example, a three-wheeled version, a narrow and low version which is particularly suitable for use in narrow greenhouses, a differential drive version and a standard version are offered by the robot. The width and the length of the robot are readily configurable by the use of aluminum tubes.

SUMMARY OF THE INVENTION

A modular robot, in particular for use in agriculture, is now described below.

The modular robot disclosed herein comprises a drive platform which has the following modules: a first lateral drive module which has at least two wheels and at least one motor for driving at least one of the wheels, a second lateral drive module which has at least one wheel and at least one motor for driving the at least one wheel, a front crossmember module for connecting first ends of the first and the second lateral drive module, and a rear crossmember module for connecting first ends of the first and the second lateral drive module. One of the two lateral drive modules has a control unit for controlling the motors of the two lateral drive modules. The two drive modules have first connecting devices at their respective ends and the two crossmember modules have second connecting devices in the region of their respective ends, and the first and the second connecting devices have mechanical connecting means. At least one of the two drive modules has at least one docking device for docking an application unit on the drive platform, and the at least one docking device has mechanical and/or electrical connecting means.

The first and the second connecting devices can additionally have electrical connecting means. This makes it possible, for example, to supply electrical energy to electrical units in the crossmember modules and/or the lateral drive modules. The electrical connecting means can also be used to connect signal transmission lines.

At least one of the two crossmember modules can have at least one sensor, in particular a radar, lidar or sonar sensor or a camera. Depending on the purpose of the robot, this enables the use of crossmember modules which are equipped with appropriate sensors. For example, a crossmember module with a radar sensor can be used to measure distances. When it comes to object detection, a crossmember module with a lidar sensor and/or a camera can be used, for example. When using the robot in water, a crossmember module with a sonar sensor can be used to identify obstacles.

The mechanical connecting means of the first and second connecting devices are designed in particular in such a way that they allow only a prescribed connection between a crossmember module and a lateral drive module. This can prevent the modules of the robot from being assembled incorrectly, for example a crossmember module being mounted in a skewed manner on the lateral drive modules.

In particular, the mechanical connecting means have three or more mortise and tenon joints, of which at least one mortise and tenon joint is not arranged on a straight line connecting the mortise and tenon joints. This arrangement of the mortise and tenon joint constitutes a measure which can be implemented with relatively few mechanical means for a prescribed connection between the crossmember module and lateral drive modules.

The control unit can be designed in such a way that it automatically configures itself during commissioning and after assembly of the drive platform from the modules by way of determining which types of lateral drive modules and crossmember modules the drive platform is assembled from and, depending on this information, configuring the control of electrical components of the modules, in particular the motors of the drive modules. For example, the control unit can determine identifiers of the individual modules of the robot and configure the control of the electrical components of the modules on the basis of the identifiers determined. In the case of a crossmember module equipped with a plurality of sensors, the control unit can, for example, automatically determine the sensor types and load appropriate software components for controlling the sensor types determined. In particular, the control unit can determine the motors used in the lateral drive units and adjust control of said motors depending on this information.

Furthermore, the control unit can be designed to communicate with electrical components in a wireless and/or wired manner via data transmission lines in the drive modules and crossmember modules. Wireless communication has the advantage that no signal lines are required in the modules for data transmission. Wired data transmission is primarily advantageous when the most reliable transmission possible is important, especially when using the robot in environments in which undisturbed radio transmission cannot be guaranteed with the required degree of reliability.

At least one of the two drive modules can have an energy store for operating the motor or the motors of the drive module. In the case of electric motors, for example, batteries, in particular rechargeable batteries, or else fuel cells can be used as energy stores.

The wheels of the lateral drive modules can have a permanently prescribed orientation, and the control unit can be designed to control the motors of the lateral drive modules in such a way that cornering by the robot is performed by way of correspondingly controlling the rotation speed of the motors of the lateral drive units. As a result, no complex mechanical or electromechanical steering device is required.

Furthermore, the width of the drive platform of the robot can be established by using crossmember modules with a corresponding length. As a result, a universally applicable drive platform of the modular robot can be created. In particular, this allows the drive platform to be adapted to a desired track width in a relatively simple manner by using crossmember modules with a corresponding length.

Further features can be found in the following description in conjunction with the exemplary embodiment shown in the drawing.

BRIEF DESCRIPTION OF THE DRAWING

The drawing shows, in the FIGURE, an exemplary embodiment of a modular robot.

DETAILED DESCRIPTION OF THE PREFERRED EMBODIMENTS

In the following description, identical, functionally identical and functionally related elements can be provided with the same reference signs. Absolute values are indicated below merely by way of example and are not to be understood as limiting.

The FIGURE shows the drive platform, composed of several modules, of a modular robot 10. The modules are two drive modules 12 and 14 and two crossmember modules 16 and 18.

The two drive modules 12 and 14 are of mirror-symmetrical construction in terms of dimensions and shape and each have two wheels 120, 122 and, respectively, 140, 142. A drive module can also have only one wheel or more than two wheels. Each of the two drive modules 12 and 14 has at least one motor, in particular an electric motor, for driving the wheels. In the case of the drive module 14, two electric motors 141, 143 which respectively drive the two wheels 140, 142 are schematically shown.

Furthermore, only one of the drive modules, namely the drive module 14, has a control unit 20 which is provided for controlling the motors of both drive modules 12, 14. The control unit 20 can additionally be configured for other functions of the robot, as will be described below. Finally, an energy store 24, in particular a rechargeable battery, is also integrated in the drive module 14, which energy store in particular supplies energy for operating the motors 141, 143 of the drive module 14. Such an energy store can also be provided in the drive module 12. As an alternative, electrical units such as a motor of the drive module 12 can also be supplied with electrical energy from the energy store 24 integrated in the drive module 14 via corresponding power supply cables which run through one of the two crossmember modules 16, 18.

Each drive module 12, 14 has first connecting devices 128 and, respectively, 148 at its respective ends 124, 126 and, respectively, 144, 146. The first connecting devices 128, 148 have mechanical connecting means 130 and, respectively, 150 in the form of tenons which are arranged at the corners of a triangle in the exemplary embodiment illustrated. Furthermore, the first connecting devices 128, 148 can have electrical connecting means 136 and, respectively, 156, for example in the form of electrical plug-in contacts. The first connecting devices 128, 148 serve primarily to mechanically fasten the drive modules 12, 14 to the crossmember modules 16, 18. If the first connecting devices 128, 148 also have electrical connecting means 136, 156, electrical signals and/or electrical energy can be transmitted via said electrical connecting means. In this case, the first connecting devices also serve as an electrical interface between the individual modules 12, 14, 16, 18. In particular, signals from or to the control unit 20 of various electrical or electronic components which are integrated in the modules 12, 16, 18 can be transmitted via the electrical connecting means 136, 156 via electrical cables which are integrated in the modules. For example, signals from a sensor 160 which is integrated in the crossmember module 16 can be transmitted via cables and the electrical connecting means 156 to the control unit 20 in the lateral drive module 14 for further processing.

The crossmember modules 16, 18 primarily serve to create a mechanically stable drive platform of the robot 10 by way of a mechanically resilient connection between the two lateral drive modules 12 and 14 by means of the front crossmember module 16 of the rear crossmember module 18. Different lengths of the crossmember modules 16, 18 can be used to create drive platforms of the robot 10 with different track widths, this being particularly advantageous for use in agriculture since the track width of the drive platform can be adapted to the corresponding purpose simply by exchanging the crossmember modules 16, 18 without complex mechanical adjustment options such as displacement devices.

However, the crossmember modules 16, 18 can also be equipped with one or more sensors 160 and thus implement additional functions of the robot 10. For example, radar, lidar or sonar sensors and/or a camera can be used as sensors in order to detect the area surrounding the robot 10, for example in order to identify obstacles on the path of the robot 10 during agricultural use and, if necessary, to automatically avoid them or to automatically stop the robot 10 in good time in front of an obstacle which is identified by the sensor 160, for example. This can be performed fully automatically by the control unit 20 which can correspondingly control the motors 141, 143 to stop the robot 10.

It is furthermore possible for the control unit 20 to control the motors 141, 143 in such a way that the robot 10 drives around an identified obstacle by way of the rotation speed of the wheels 120, 122 or 140, 142 being influenced by corresponding control of their drive motors via the control unit 20 in such a way that the robot 10 performs cornering. This is particularly advantageous when the drive modules 12, 14 are intended to be constructed in as simple a manner as possible, in particular when they are not intended to comprise a mechanical or electromechanical steering device and the wheels 120, 122 and, respectively, 140, 142 have a permanently prescribed orientation 123, that is to say cannot be steered, as is the case in the exemplary embodiment shown in the FIGURE.

In order to ensure that the modules 12, 14, 16, 18 can be exchanged in as simple a manner as possible and assembled without errors, the crossmember modules 16, 18 can have, as mechanical connecting means, mortises 188 for receiving the tenons 130, 150 of the drive modules 12, 14. The two crossmember modules have second connecting devices (184, 186 shown for crossmember module 18) in the region of their respective ends, and the first and the second connecting devices have mechanical connecting means. For assembly, it is then only necessary to position a crossmember such that one of its ends 180, 182 rests against the end 124, 126, 144, 146 of a drive module such that the tenons 130, 150 engage in the corresponding mortises 188 and can be locked in said mortises. Electrical connecting means 136, 156 at the end 124, 126, 144, 146 of the drive module 12, 14 can likewise make electrical contact with the corresponding electrical connecting means 190 of the crossmember. By arranging the tenons 130 at the corners of an in particular non-equilateral triangle, it can also be ensured that the crossmember module can only be mechanically connected to the drive module in one way.

The two lateral drive modules 12 and 14 additionally each have two docking devices 132, 134 and, respectively, 152, 154 which are provided for docking an application unit (not shown) on the drive platform. The docking devices 132, 134, 152, 154 can be designed as simple recesses or openings for inserting and locking corresponding fastening means of an application unit. They can additionally have electrical interfaces, in particular in order to supply electrical energy to electrical components of an application unit, such as electric motors, actuators, sensors and the like, and/or for data and/or signal transmission.

The concept of a modular robot described herein offers in particular the advantages and possibilities listed below:

- A modular concept based on submodules which can be freely combined.
- Submodules: Driving modules which have electrical drives and wheels, possibly an energy module which has electrical energy stores, possibly a sensor module which can have a combination of sensors, possibly a charging module which can have various options for charging the electrical energy stores, 3rd-party modules can likewise be integrated by disclosing the interface definition.
- A variation in the submodules allows even more specific adaptation to the application or the field of use (e.g. adaptation to an exact track width by selecting the driving module with suitable tires, selection of the appropriate sensor module for a specific task (e.g. sensor system for detecting weeds)).
- The mechanical and electrical module interfaces can be designed in accordance with the poka-yoke principle, so that error-free assembly of the overall robot can be ensured.
- An automatic configuration of the software of the control unit can be implemented according to an identified composition of the modules; in particular, a combination of the modules can be identified by an algorithm that is implemented in the operating software of the control unit.
- Reception of different attachments (work modules) can be guaranteed by open standardized interfaces.
- A combination comprising a modular robot concept and a device carrier platform is created.
- A particularly safety-compliant, freely configurable robot platform which automatically and independently identifies the module combination can be created.
- Repair by users can also be made possible, this in particular not requiring any expert know-how; modules can be exchanged in a simple manner.
- A low total cost of ownership can be achieved owing to simple maintenance.
- Minimization of the downtime can be achieved owing to the possibility of quick repairs.

The invention claimed is:

1. A modular robot with a drive platform comprising:
   a first lateral drive module which has at least two wheels and at least one motor for driving at least one of the wheels, and has respective first and second end faces;
   a second lateral drive module which has at least one wheel and at least one motor for driving the at least one wheel, and has respective first and second end faces;
   a front crossmember module for fixedly coupling the first end face of the first lateral drive module to the first end face of the second lateral drive module; and
   a rear crossmember module for fixedly coupling the second end face of the first lateral drive module to the second end face of the second lateral drive module,
   wherein one of the two lateral drive modules has a control unit for controlling the motors of the two lateral drive modules,
   wherein the two drive modules have first connecting devices at their respective ends and the two crossmember modules have second connecting devices in the region of their respective ends and the first and the second connecting devices have mechanical connectors, and
   wherein at least one of the two drive modules has at least one docking device for docking an application unit on the drive platform and the at least one docking device has mechanical and/or electrical connectors.

2. The robot as claimed in claim 1, wherein the first and the second connecting devices additionally have electrical connectors.

3. The robot as claimed in claim 1, wherein at least one of the two crossmember modules has at least one sensor.

4. The robot as claimed in claim 1, wherein the mechanical connectors of the first and the second connecting devices are designed in such a way that they allow only a prescribed connection between a crossmember module and a lateral drive module.

5. A modular robot with a drive platform comprising:
   a first lateral drive module which has at least two wheels and at least one motor for driving at least one of the wheels;
   a second lateral drive module which has at least one wheel and at least one motor for driving the at least one wheel;
   a front crossmember module for connecting first ends of the first and the second lateral drive module; and
   a rear crossmember module for connecting first ends of the first and the second lateral drive module,
   wherein one of the two lateral drive modules has a control unit for controlling the motors of the two lateral drive modules,
   wherein the two drive modules have first connecting devices at their respective ends and the two crossmember modules have second connecting devices in the region of their respective ends and the first and the second connecting devices have mechanical connectors, and
   wherein at least one of the two drive modules has at least one docking device for docking an application unit on the drive platform and the at least one docking device has mechanical and/or electrical connectors, and wherein the mechanical connectors have three or more mortise and tenon joints, of which at least one mortise and tenon joint is not located on a straight line connecting the mortise and tenon joints.

6. The robot as claimed in claim 1, wherein the control unit is designed in such a way that it automatically configures itself during commissioning and after assembly of the drive platform from the modules by way of determining which types of lateral drive modules and crossmember modules the drive platform is assembled from and, depending on this information, configuring the control of electrical components of the modules, in particular the motors of the drive modules.

7. The robot as claimed in claim 1, wherein the control unit is designed to communicate with electrical components in a wireless and/or wired manner via data transmission lines in the drive modules and crossmember modules.

8. The robot as claimed in claim 1, wherein at least one of the two drive modules has an energy store for operating the motor or the motors of the drive module.

9. A modular robot with a drive platform comprising:
    a first lateral drive module which has at least two wheels and at least one motor for driving at least one of the wheels;
    a second lateral drive module which has at least one wheel and at least one motor for driving the at least one wheel;
    a front crossmember module for connecting first ends of the first and the second lateral drive module; and
    a rear crossmember module for connecting first ends of the first and the second lateral drive module,
    wherein one of the two lateral drive modules has a control unit for controlling the motors of the two lateral drive modules,
    wherein the two drive modules have first connecting devices at their respective ends and the two crossmember modules have second connecting devices in the region of their respective ends and the first and the second connecting devices have mechanical connectors,
    wherein at least one of the two drive modules has at least one docking device for docking an application unit on the drive platform and the at least one docking device has mechanical and/or electrical connectors, and
    wherein the wheels of the lateral drive modules have a permanently prescribed orientation and the control unit is designed to control the motors of the lateral drive modules in such a way that cornering by the robot is performed by way of correspondingly controlling the rotation speed of the motors of the lateral drive units.

10. The robot as claimed in claim 1, wherein a width of the drive platform of the robot can be established by using crossmember modules with an appropriate length.

11. The robot as claimed in claim 3, wherein the at least one sensor is a radar, a lidar, a sonar sensor, or a camera.

* * * * *